No. 861,141. PATENTED JULY 23, 1907.
P. O. OLSON.
TRIMMING CHUTE.
APPLICATION FILED OCT. 19, 1906.
3 SHEETS—SHEET 1.
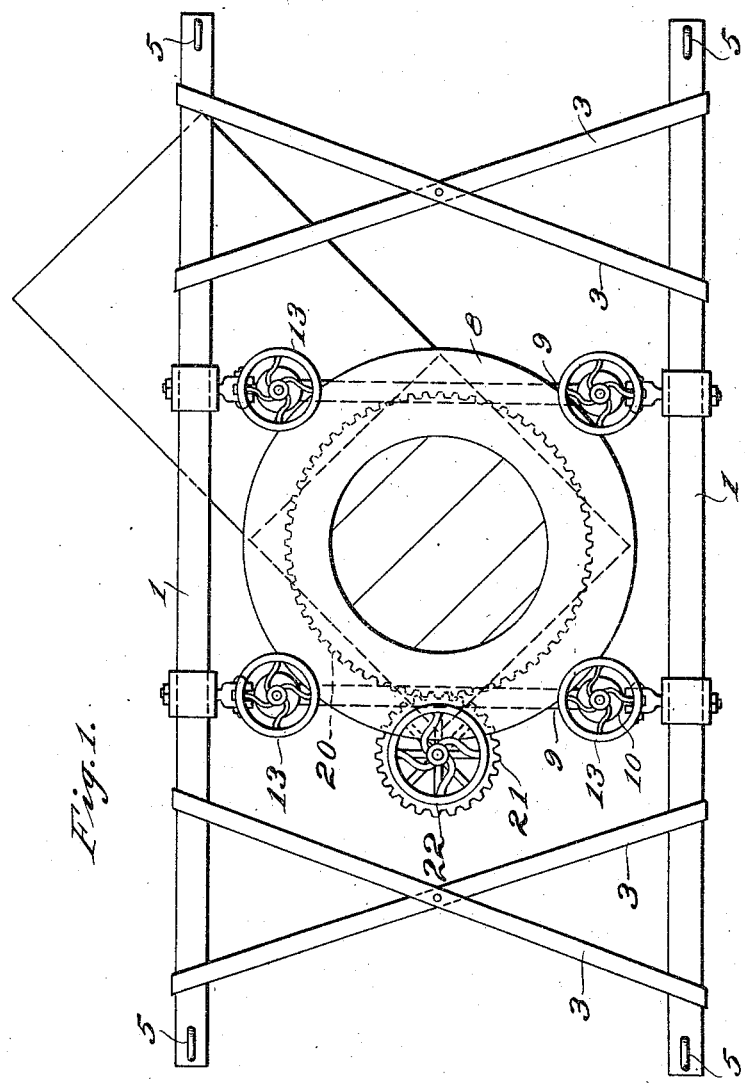

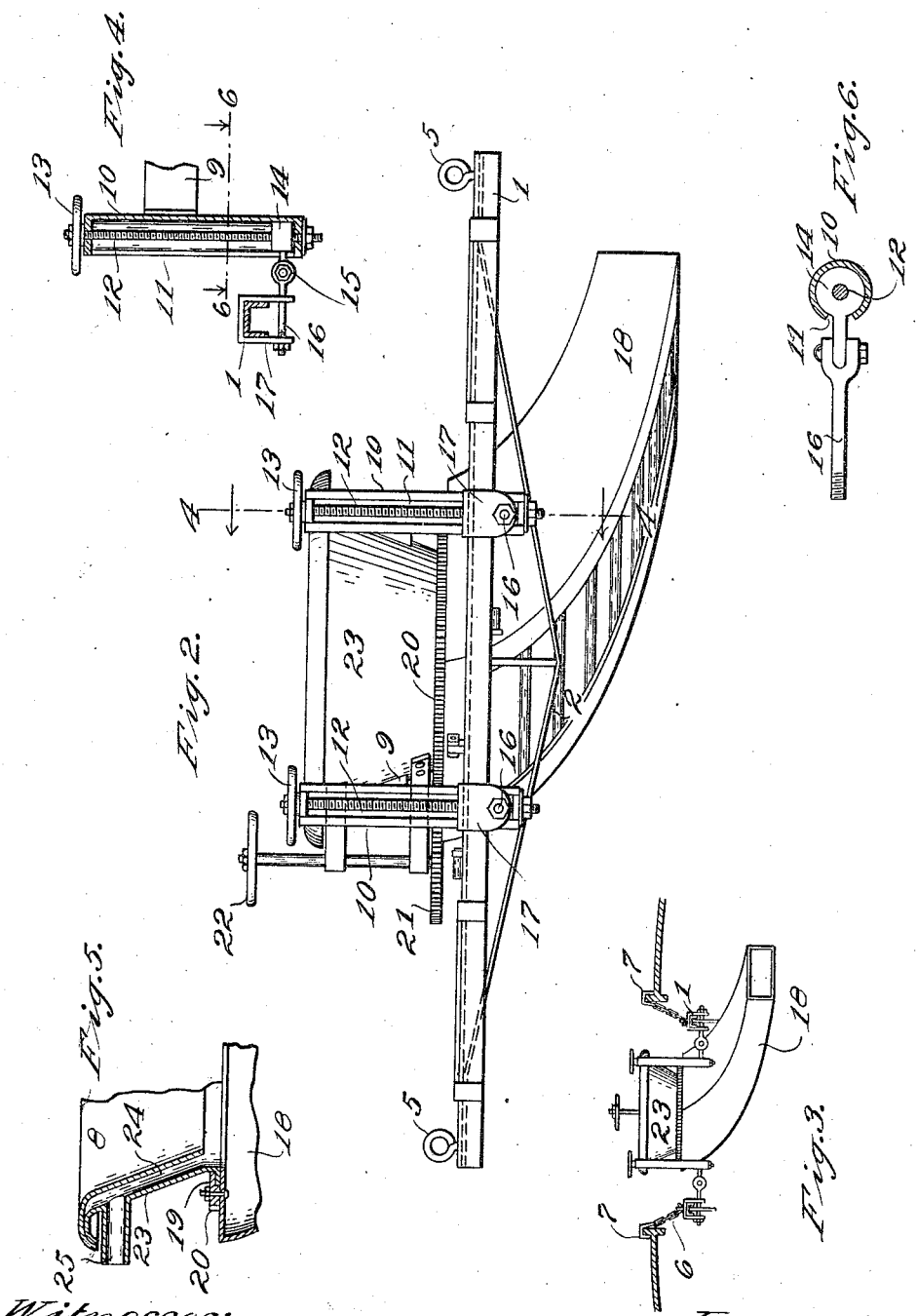

No. 861,141. PATENTED JULY 23, 1907.
P. O. OLSON.
TRIMMING CHUTE.
APPLICATION FILED OCT. 19, 1906.
3 SHEETS—SHEET 3.
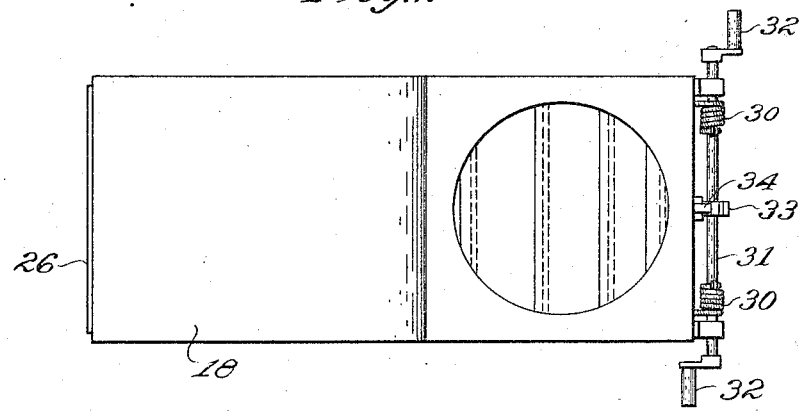
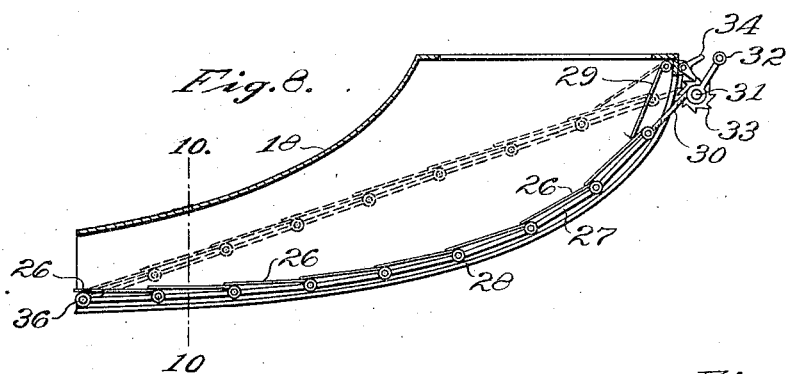
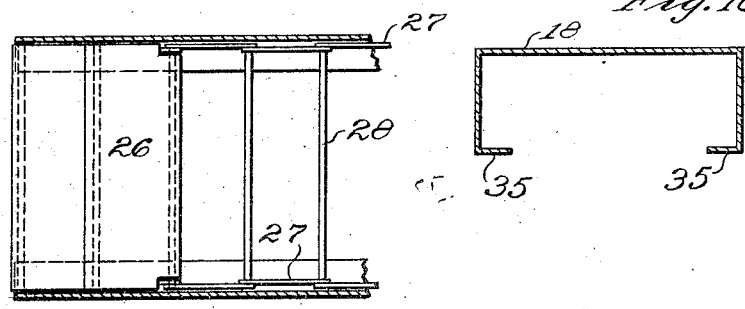

UNITED STATES PATENT OFFICE.

PETER O. OLSON, OF SOUTH CHICAGO, ILLINOIS.

TRIMMING-CHUTE.

No. 861,141.  Specification of Letters Patent.  Patented July 23, 1907.

Application filed October 19, 1906. Serial No. 339,693.

*To all whom it may concern:*

Be it known that I, PETER O. OLSON, a citizen of the United States of America, and a resident of South Chicago, in the county of Cook and State of Illinois, have invented certain new and useful Improvements in Trimming-Chutes, of which the following is a specification.

The main objects of this invention are to provide an improved form of trimming chute which may be readily attached across the hatch of a vessel and may be readily shifted from one deck to another; to provide improved means for supporting such trimming chute to permit the same to be easily adjusted for directing granular matter in any direction between the decks of the vessel so as to fill all spaces without requiring the necessity of trimming by hand.

These objects are accomplished by the device shown in the accompanying drawings, in which:

Figure 1 is a top plan of a trimming chute constructed according to this invention. Fig. 2 is a side elevation of the same. Fig. 3 is an end elevation on a smaller scale, showing the method of suspending the same from the hatch-coaming of a vessel. Fig. 4 is a detail, partly broken away and partly in section, showing the means of connecting the hopper with the supporting frame. Fig. 5 is a sectional detail showing the construction of the hopper and its connection with the discharge spout. Fig. 6 is a sectional detail taken on the line 6—6 of Fig. 4. Fig. 7 is a top plan of the discharge spout, the parts which are above being removed. Fig. 8 is a side elevation showing the adjustable bottom, the upper part being in section. Fig. 9 is a detail in plan of the bottom of the same, the side being partly broken away. Fig. 10 is a section of the spout on the line 10—10 of Fig. 8, the bottom being omitted.

In the construction shown in the drawings, the supporting frame comprises a pair of parallel beams 1 preferably braced by truss rods 2 and rigidly connected together by intersecting cross bars 3. The beams 1 are provided at their ends with eyebolts 5 to which are connected chains 6 all of the same length and having hooks 7 at their upper ends adapted to engage the hatch coaming of a vessel for suspending the supporting frame in a horizontal plane across the hatch opening. The chains 6 are of such length as to make the adjusting hand wheels easily accessible from the deck from which the device is supported.

A casing 23, having therein a vertically disposed chute or hopper 8 is rigidly secured between a pair of parallel beams 9 which are in turn rigidly secured to vertically disposed guide members 10 located at the ends of the beams 9. The guide members 10 are of tubular form and have a slot 11 extending vertically along one side. A threaded adjusting shaft extends longitudinally through each of the guide members 10, being provided with a hand wheel 13 for rotating it in its bearings and being secured against shifting longitudinally in the guide member. Each shaft 12 has mounted thereon a nut 14 which slidably fits the interior of the guide member 10 and has an arm 15 extending transversely outward through the slot 11 and hinged to a bolt 16 which is horizontally disposed and secured to the beam 1 by clips 17. The slots 11 are wide enough to allow a limited rotation of the nuts 14. The bolts 16 are arranged to have a limited amount of play in the clips 17 which connect them to the beams 1 so as to permit of the necessary yielding to allow the tilting of the spout, as will be hereinafter described.

The discharge spout 18 is mounted in alinement with the hopper 8 so as to form a continuation thereof, its mouth being upwardly disposed and rotatably connected with the casing 23. The form of joint is indicated in Fig. 5. The casing 23 is provided with an outwardly extending flange 19 at its lower end which is engaged by an annular member 20 provided with gear teeth on its outer periphery. The member 20 meshes with a pinion 21 which is journaled on the casing and provided with a hand wheel 22 for rotating it. The spout is rectangular in cross section and is curved so as to discharge material in a more or less horizontal direction. The casing 23 is spaced away from the walls of the hopper 8 to form an annular passage for directing air downward along the walls of the hopper and into the spout. This air is admitted by a pipe 25, which may be connected with a blower by means of flexible tubing. The blower is not shown in the drawings, since it would usually be at some distance from the chute and may be of any usual type. The annular stream of air, which flows downward around the hopper, has the effect of causing grain or like granular material to be carried from the hopper through the spout and to be thrown a considerable distance beyond the discharge end thereof.

Besides the mechanism for tilting the spout which has already been described, it is preferred to also provide an adjustable bottom wall for the spout. This is shown in Figs. 7 to 9 inclusive. The adjustable bottom consists of a series of overlapping plates 26 which are mounted upon a pair of link belts 27. The two belts 27 are connected together by a plurality of transverse rods 28 which also form the pivots between the links of the belts. Each of the plates 26 is hinged to the rod 28 at its upper edge, leaving its lower edge loosely resting upon the next succeeding plate. The uppermost plate 29 is hinged directly to the walls of the spout 18 and rests upon the next plate so as to close the gap at the upper end of the adjustable bottom. The upper end of the belts 27 are preferably provided with flexible parts formed of chain or cable 30 and wound upon a shaft or drum 31. Cranks 32 are provided for rotating the drum. A ratchet 33 and dog or pawl 34 normally prevent the unwinding of the cables 30. The side walls of the spout 18 are preferably turned inward along their lower edges to form flanges 35 which support the bottom when in its lowest position of adjustment. The lower ends 36 of the link belts are secured to the end of the spout so that when the cables 30 are wound upon the drum, the bottom may be adjusted to the position shown by dotted lines in Fig. 8.

The operation of the device shown is as follows: The beams 1 are supported from the coaming of the hatch in the vessel's deck as indicated in Fig. 3. The grain or other material which is to be loaded into the vessel is then discharged into the hopper 8 and conveyed toward one side by means of the spout 18. The operator directs the spout in different directions from time to time so as to fill all portions of the hold which are reached from the hatch at which the device is suspended. He also tilts the spout by means of the adjusting screws 12 so as to direct the grain to points close under the deck as the hold becomes filled. By adjusting the bottom of the spout, the operator is still further able to direct the material which is being discharged and he is also able to cause a contraction or enlargement of the passage through the spout and thus control the velocity of discharge without changing the speed of the blower.

The device may be readily transferred from one hatch to another, since to attach it to a deck, it is merely necessary to hang the hooks 7 over the coaming of the hatch. As the spout is adjusted by means of the adjusting screws 12, the swivel connection between the arms 15 and the bolts 16 together with the play of the bolts 16 in the clips 17 permits sufficient movement to allow the spout and hopper to be tilted.

What I claim as my invention and desire to secure by Letters Patent is:

1. The combination of a horizontally disposed supporting frame, a vertically disposed hopper mounted on said frame and adjustable to a plurality of different inclinations with respect to said frame, a spout connected in alinement with the throat of said hopper and rotatably mounted thereon, and a plurality of hooks having flexible connection to said supporting frame at different points around its edges, and adapted to hook over the hatch-coaming of a vessel for suspending the frame across a hatch opening.

2. The combination of a pair of parallel beams, a horizontally disposed rigid frame, a vertically disposed hopper, a plurality of vertically disposed threaded shafts supporting said hopper at different sides, means for separately rotating said shafts for adjusting the hopper to an angle with respect to the frame, and a spout secured to the throat of the hopper and extending toward one side and adapted to be rotated about the axis of the hopper.

3. The combination of a horizontally disposed frame, a vertically disposed hopper mounted thereon, a plurality of vertically disposed threaded shafts rotatably mounted at different points around the periphery of the hopper, a nut on each of said shafts having movable connection with said frame for supporting the hopper, means for separately rotating said shafts for adjusting the hopper at an angle to the plane of the frame, and a bent spout mounted in alinement with the hopper and adapted to discharge toward one side thereof, said spout being mounted to rotate about a vertically disposed axis.

4. The combination of a horizontally disposed frame, a vertically disposed hopper, a plurality of vertically disposed shafts arranged around the periphery of the hopper and rotatably mounted thereon for supporting the hopper, a nut on each of said shafts, having swiveled and sliding connection with the frame, means for separately rotating said shafts for adjusting the hopper to a plurality of different angular positions with respect to the frame, a discharging spout mounted in alinement with the hopper and being curved toward one side, and means for rotating said spout on the frame.

5. The combination of a horizontally disposed frame, suspending hooks connected with said frame and adapted to support the same across an open space having a vertically disposed coaming around its edges, a spout having an upwardly disposed mouth and having a discharging throat extending toward one side of said mouth, a plurality of vertically disposed adjusting screws arranged around said spout, a plurality of nuts each having threaded engagement with one of said screws and having swiveled connection with the frame, and means for separately rotating said screws for adjusting the spout to different angles, a second frame adapted to hold said screws in fixed relation to each other, and means for rotating said spout with respect to said second frame.

6. The combination of a horizontally disposed frame, a second frame carried thereby, a plurality of vertically disposed threaded shafts arranged around said second frame in parallel relation to each other, each being separately rotatable thereon and each secured against longitudinal shifting, a spout rotatable about a vertically disposed axis on said second frame, having an upwardly disposed mouth and a discharge throat extending toward one side, a plurality of nuts, each having threaded engagement with one of said shafts, supports for said nuts adapted to each have a limited lateral movement on said first frame, and having swiveled connection with its respective nut.

7. The combination of a pair of horizontally disposed beams lying in substantially the same horizonal plane and rigidly connected together, means for detachably securing said beams across the hatch of a vessel, a vertically disposed hopper mounted between said beams, a spout mounted at the lower end of said hopper and adapted to conduct granular matter toward one side thereof, said spout being rotatable about the axis of the hopper, and adapted to be tilted vertically with respect to said frame in any of its positions around said axis.

8. In a trimming chute, the combination of a vertically disposed hopper provided with means for suspending the same in the hatchway of a vessel, a spout at the lower end thereof and adjustable thereon for discharging granular material in different directions therefrom, and an air inlet located near the lower end of said hopper and arranged to admit and direct a current of air downwardly along said spout for expelling material therefrom.

9. The combination of a vertically disposed hopper provided with means for suspending the same in a hatchway of a vessel for loading granular material, a casing surrounding the lower end of said hopper, being spaced away from said lower end and forming a continuation thereof, a discharge spout mounted on said casing below the hopper and in alinement therewith and adjustable for directing material in different directions, and means for admitting air to said casing above the lower end of the hopper, thereby causing a downward air current for discharging the material from the spout.

10. A trimming chute comprising a vertically disposed hopper, a casing inclosing the lower part of said hopper and spaced therefrom to form a passage for air, and a spout mounted on said casing below said hopper and communicating with said hopper and air passage, said spout being curved or bent for directing granular material toward one side from said hopper, and a pipe for forcing air into the casing above the bottom of the hopper for ejecting material from the spout.

11. A trimming chute comprising a vertically disposed hopper, a casing inclosing the lower part of said hopper and spaced therefrom to form a passage for air, and a spout mounted on said casing below said hopper and communicating with said hopper and air passage, said spout being curved or bent for directing granular material toward one side from said hopper, and a pipe for forcing air into the casing above the bottom of the hopper for ejecting material from the spout, said spout being rotatable about a vertically disposed axis and being adapted to be tilted for directing the stream of material issuing therefrom.

Signed at Chicago this 17th day of October 1906.

PETER O. OLSON.

Witnesses:
E. A. RUMMLER,
L. A. SMITH.